United States Patent
Browning

(10) Patent No.: US 12,162,391 B2
(45) Date of Patent: Dec. 10, 2024

(54) CHAIR FOR LANDING AND TAKE-OFF

(71) Applicant: GRAVITY INDUSTRIES LIMITED, Salisbury (GB)

(72) Inventor: Richard Browning, Salisbury (GB)

(73) Assignee: GRAVITY INDUSTRIES LIMITED, Salisbury (GB)

( * ) Notice: Subject to any disclaimer, the term of this patent is extended or adjusted under 35 U.S.C. 154(b) by 299 days.

(21) Appl. No.: 17/717,583

(22) Filed: Apr. 11, 2022

(65) Prior Publication Data

US 2022/0324363 A1    Oct. 13, 2022

(30) Foreign Application Priority Data

Apr. 9, 2021  (GB) ..................................... 2105068

(51) Int. Cl.
*B60N 2/90*    (2018.01)

(52) U.S. Cl.
CPC ...................................... *B60N 2/90* (2018.02)

(58) Field of Classification Search
CPC ........... B60N 2/90; B64D 10/00; B64D 11/00
See application file for complete search history.

(56) References Cited

U.S. PATENT DOCUMENTS

| | | | | |
|---|---|---|---|---|
| 1,107,579 A | * | 8/1914 | Brady | B64G 4/00 |
| | | | | 105/87 |
| 4,546,491 A | * | 10/1985 | Beaussant | B64D 10/00 |
| | | | | 600/20 |
| 5,058,506 A | | 10/1991 | Swan | |
| 5,121,744 A | * | 6/1992 | Njemanze | G09B 9/10 |
| | | | | 600/20 |
| 5,477,850 A | * | 12/1995 | Zegler | A62B 17/008 |
| | | | | 128/202.19 |
| 2013/0147239 A1 | * | 6/2013 | Guering | B64D 10/00 |
| | | | | 297/185 |
| 2022/0081115 A1 | * | 3/2022 | Sulger | B64D 10/00 |
| 2022/0183405 A1 | * | 6/2022 | Beyeler | B64D 10/00 |
| 2023/0398916 A1 | * | 12/2023 | Hampton | B64D 25/00 |

FOREIGN PATENT DOCUMENTS

| | | |
|---|---|---|
| CN | 109771231 A | 5/2019 |
| GB | 2559971 | 8/2018 |

OTHER PUBLICATIONS

Gravity Industries, "Navy Assault Trials", retrieved from the Internet: URL: https://www.youtube.com/watch?=H4FUBfp9kS0, [0:02"-0:06" and 0:31"-0:42"] retrieved on Dec. 9, 2021, May 13, 2020, XP55870933.

* cited by examiner

*Primary Examiner* — Christopher P Ellis
(74) *Attorney, Agent, or Firm* — FisherBroyles, LLP; Jason P. Mueller

(57) ABSTRACT

A chair for use in take-off or landing of a user wearing personal flying equipment may include a seat for the user to straddle such that the user faces in a forward direction. The chair may include a torso support for supporting a torso of the user sitting on the seat. The torso support may be concave and define an opening facing the seat. The seat and torso support may be mounted to a structure. A base member may be rigidly connected to the structure and may extend outwardly from either side of the structure, leaving a space below the structure for receiving a leg of the user when the user sits on the seat.

2 Claims, 3 Drawing Sheets

CHAIR FOR LANDING AND TAKE-OFF

RELATED APPLICATIONS

This application claims the benefit under 35 U.S.C. § 119(a)-(d) of United Kingdom Application Number GB2105068.7, filed Apr. 9, 2021, which is incorporated herein, in its entirety, by this reference.

BACKGROUND

The present disclosure relates to a chair for use by a user of personal flying equipment such as a flight suit. Personal flying equipment enables a person to fly without having to sit inside an enclosure.

An example of such flying equipment, specifically, a flight suit, is described in GB2559971, although the present disclosure is not so limited. Other alternative personal flying equipment, for example, not having propulsion units held in the hand, may also use the chair of the present disclosure.

Such flying equipment typically requires a user to land on their feet.

SUMMARY

The inventor has discovered that personal flying equipment can be more difficult to land on an unstable base, such as a moving vehicle.

According to the present dissector, there is provided a chair. The chair may be use in take-off or landing of a user wearing personal flying equipment. The chair may include a seat for the user to straddle such that the user faces in a forward direction and a torso support for supporting a torso of the user sitting on the seat, the torso support may be concave and thereby define an opening facing the seat. The chair may include a structure to which the seat and torso support are mounted and a base member may be rigidly connected to the structure and may extend outwardly therefrom. The torso support may extend outwardly to either side of the structure leaving a space below for receiving a leg of the user sat on the seat.

In some embodiments, the chair is mounted on, or forms part of a vehicle, such as a boat.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

For a better understanding of the invention and to show how the same may be put into effect, reference will be made, by way of example only, to the accompanying drawings in which.

DETAILED DESCRIPTION

Figure 1:
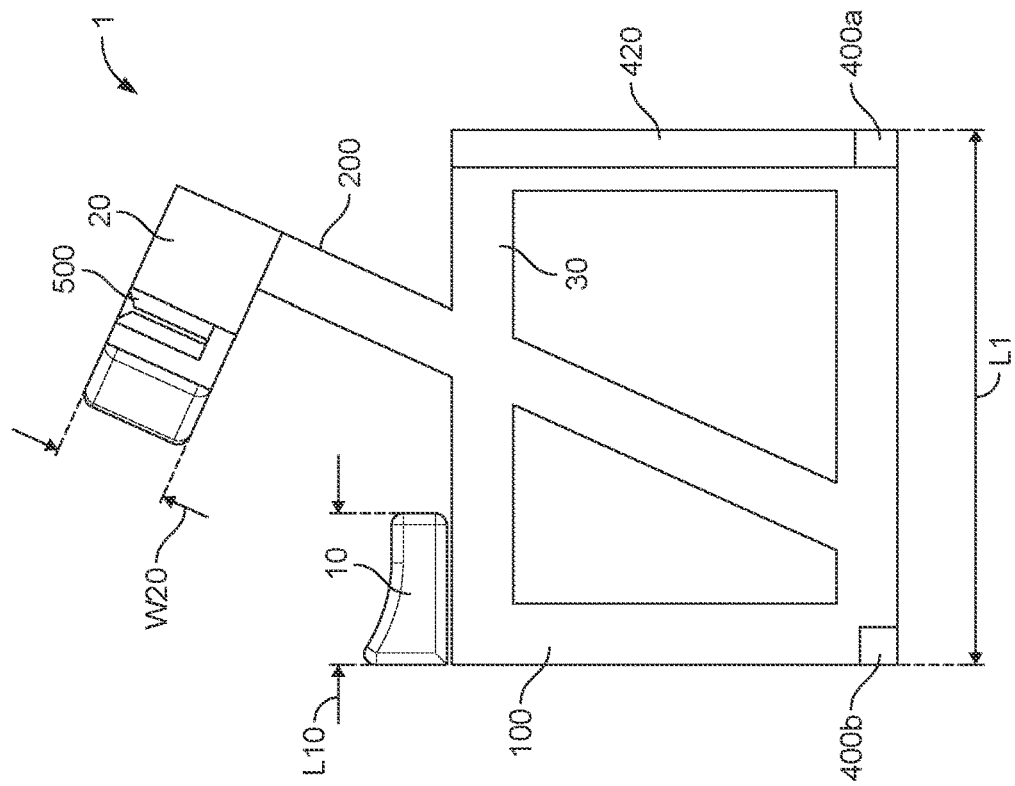
FIG. 1 shows a perspective view of a chair.
Figure 2:
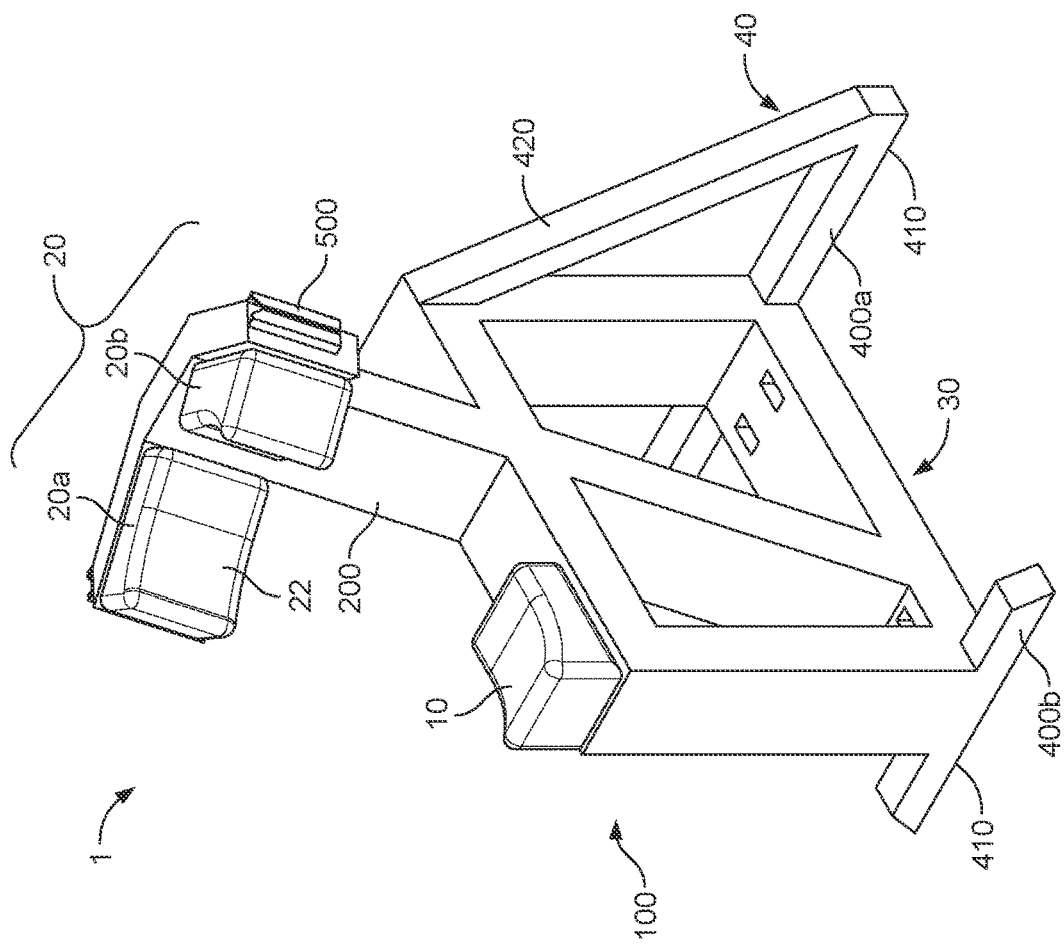
FIG. 2 shows a side view of the chair of FIG. 1.
Figure 4:
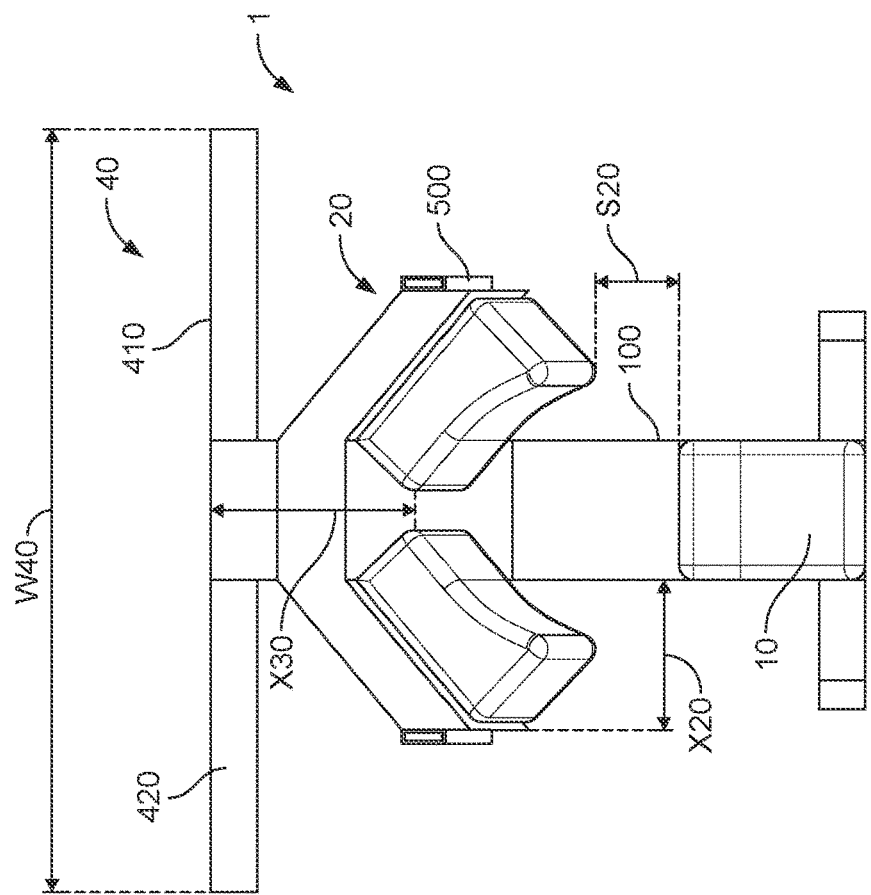
FIG. 4 shows a top view of the chair of FIG. 1.
Figure 3:
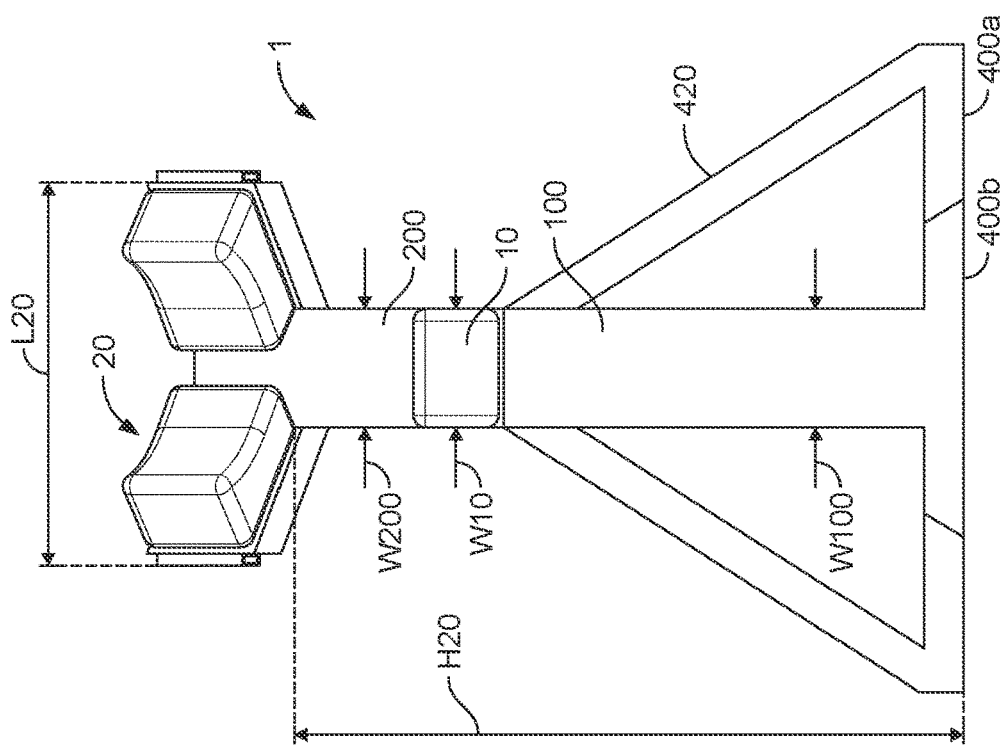
FIG. 3 shows a front view of the chair of FIG. 1.

FIGS. 1 to 4 show an embodiment of a chair 1 in accordance with the invention. The chair 1 comprises: a seat 10; a torso support 20; a structure 30; and a base 40.

The chair 1 preferably has a length, L1, in the forward direction of at least 500 mm, but more preferably at least 700 mm. The longer the chair 1 in the forward direction, the better it is able to resist the impact of the user on landing.

The chair 1 is intended to be for use in take-off or landing of a user wearing personal flying equipment. It should be noted that the user's flight is not perfectly accurate, and the user may wish to land on a moving vehicle. Therefore, the chair 1 preferably has a narrow seat 10 and narrow structure 30 that enables the user's legs free movement, but a wide torso support 20 for receiving the user's torso on landing. The torso support 20 as described below, is advantageously configured to provide a centering reaction force to the user's torso as landing takes place. Moreover, the chair is useful for enabling comfort of the user when carrying inactive propulsion units in their hands.

The seat 10 is arranged for the user to straddle. That is, the user can sit on the seat with their legs extending either side of the seat 10. In some embodiments, seat 10 has a width, W10, of between 90 mm and 180 mm, preferably. The wider the seat 10, the more comfort, but the harder it is for the seat 10 to be straddled.

The seat 10 is mounted on a seat portion 100 of the structure 30. In some configurations of the structure 30, the seat portion 100 may extend below the seat 10. In which case, the seat portion 100 has a maximum width, W100, of no more than 180 mm, so that the user can straddle the seat 10 and the seat portion 100. The seat 10 is preferably cushioned. The upper surface of the seat 10 or, if provided, the cushioning of the seat 10 may be curved or shaped to have greater depth at its rearmost end. Alternatively, or in addition, the seat 10 may be sloped to have a lower front end than rear end. These measures can bias the user forwards towards the torso support 20. This can also be particularly advantageous to prevent the user falling off the chair 1 when the chair 1 is on a vehicle that may be subject to a variety of accelerations.

The rear edge of the seat 10 defines the rearmost end of the chair 1.

The seat 10 defines a forward direction, which is the direction that the user faces when sitting on the seat 10, facing the torso support 20. Perpendicular to the forward direction are the lateral and vertical directions. The width of the seat 10 is measured in the lateral direction.

The torso support 20 is for supporting a torso of the user when sitting on the seat 10. The torso support 20 is spaced from the seat 10 by a distance selected such that a user may sit on the seat and lean forward to contact their torso, preferably their chest on the torso support 20. That is, the chair 1 is intended for the user to face the torso support 20 when seated. The concavity of the torso support 20 is open on the side facing the seat 10.

The torso support 20 extends outwardly to either side of the structure 30 leaving a space below for receiving a respective leg of the user when sitting straddling the seat 10. The torso support 20 preferably extends outwardly from the structure 30 by a distance, X20, of between 125 mm and 350 mm.

The torso support 20 is elongate and concave. For example, the torso support 20 may be said to generally define a C-shape. The torso support 20 preferably extends by a distance, L20, of between 400 mm and 850 mm in the lateral direction from end to end, preferably 550 mm.

In some embodiments, the torso support 20 may have an adjustable width (for example, it may comprise telescopic arms supporting cushioning). The width would be adjustable between 400 mm and 850 mm.

The torso support 20 may be a curved concave shape or made up of straight sections. The torso support 20 is preferably cushioned. The cushioning of the torso support 20 may be curved with thicker cushioning at its distal ends, that is, the end at greater distance from the structure 30. This can bias the user towards the center of the torso support 20.

The torso support 20 preferably has a width, W20, perpendicular to its length, which is the direction of its elongation, of between 130 mm and 250 mm. The width and length define the area which the user's torso may contact when sat on the seat 10. A narrower torso support 20 would not be comfortable for a landing user to impact against, whereas a wider torso support would be a hindrance to the carrying of equipment.

The torso support 20 is preferably tilted away from the seat 10 (that is, such that the center of the torso support 20 is lower than the distal ends of the torso support 20). In some embodiments, the angle of the torso support 20 may be adjustable.

The ends of the torso support 20 preferably extend at an angle from one another. Preferably, the angle between the ends of the torso support 20 is in the range 90 degrees to 100 degrees, most preferably 95 degrees. That angle may be defined between straight sections of the torso support 20, or if curved, between tangents of the torso support 20 at its distal ends.

The torso support 20 is mounted on a torso portion 200 of the structure 30. The torso portion 200 may be an arm 200 extending to the middle of the torso support 20. The arm 200 may extend from the seat portion 100. The user may, on landing or take-off, wish to avoid engaging the arm with their legs. It is therefore preferred that the width, W200, of the torso portion/arm 200 is no more than the width of the seat, or no more than 180 mm.

In some embodiments, the angle of the arm 200 may be adjustable to enable the tilt angle of the torso support 200 to be adjusted. Preferably, the torso support 20 may be adjusted over a range of 30 degrees.

The structure 30 extends from a base 40. In some embodiments, the base 40 is rigidly connected to the structure 30. It may, for example, be integrally connected to the structure 30, or a separate component to which the structure 30 is connected. In some embodiments, the rigid connection means that the base 40 cannot move or rotate relative to the structure 30, such that the chair 1 is held stationary relative to anything to which the base 40 is attached.

The structure 30 extends in the forward direction. The structure 30 is preferably elongate such that its length in the forward direction is greater than its width in the lateral direction. Preferably, the length of the chair 1 is defined by the length of the structure 30, and so the structure 30 has a length in the forward direction of at least 500 mm, but more preferably at least 700 mm.

The structure 30 is preferably formed as a framework of beam members, such as metal beam members.

The base 40 extends laterally from the structure 30. In this way, the base 40 provides stability to the structure 30, to prevent it from wobbling relative to the ground or vehicle. The base 40 preferably has a width, W40, in the lateral direction of at least 600 mm, most preferably at least 820 mm. The base 40 width could be much wider, but preferably the width is up to 1000 mm. The base 40 may be formed of one or more separate members 400a, 400b extending from the structure 30. In which case, the width of the base is defined by the widest member.

Struts 420 between the base 40 and a portion of the structure 30 spaced from the base 40 may, optionally, be provided for additional rigidity. Struts 420 are preferably provided in one or more pairs on opposing sides of the structure 30. However, struts 420 are preferably not located between the seat 10 and the torso support 20, where they would reduce the freedom of movement of the user's legs. Struts 420 are preferably located forwardly of the torso support 20.

As can be seen in some embodiments, the base 40 defines a planar surface 410 (the surface of contact of the chair 1 with the ground). Base surface 410, however, need not be planar. For example, the base surface 410 may be the upper surface of a vehicle such as a boat, and may be slightly curved.

In the discussion that follows, angles and distances relative to the base surface 410 defined by the base 40 are discussed. When the base surface is planar, angles are to be considered relative to the surface, and distances measured along the surface normal. When the base surface is curved or slightly curved, the angle of a line is to be considered relative to the tangent to the base surface where the line intersects the base surface, and distances measured along the relevant surface normal.

The torso support 20 is preferably inclined (such that the plane of its concavity is tilted and the center of the torso support 20 is lower than the distal ends of the torso support 20) relative to the base surface 410 by an angle in the range 50 degrees to 80 degrees, preferably 65 degrees.

Although not essential, in the specific embodiment, the arm 200 therefore also extends relative to the base surface 410 at an angle in the range 50 degrees to 80 degrees, preferably 65 degrees.

The lowermost part of the torso support 20 is spaced from the base 40 by a distance, H20, of at least 930 mm, preferably 971 mm. Any lower, and it could in some cases obstruct the flight of the user.

The torso support 20 has an upper surface preferably spaced from the base 40 by a distance of no more than 985 mm. The upper surface of the torso support 20 preferably defines the highest point on the chair 1. Accordingly, the user resting on the torso support 20 can see forward of the chair 1.

The length of the seat 10 in the forward direction, L10, is preferably at least 19 cm, more preferably at least 22 cm. The seat 10 has a front edge, which is the forwardmost extent of the seat 10.

In some embodiments, it may be beneficial to limit the length of the seat 10 to no more than 25 cm in order to ensure that any propulsion units carried on the back of the user do not burn the seat 10.

The torso support 20 defines one or more rear-facing concave contact surfaces 22 for contact with the torso of a user. The rearmost extent of the contact surface 22 is preferably level, or substantially level, with the front edge of the seat 10. The rearmost extent of the contact surface 22 may be spaced from the front edge of the seat 10 by a distance, S20, of no more than 100 mm in the forward direction.

The structure 30 preferably extends forwardly beyond the rearmost part of the contact surface 22 (i.e., the center of the torso support 20). The structure 30 preferably extends forwardly beyond the contact surface 22 by a distance, X30, of at least 300 mm.

The chair 1 may be used by a user having personal flying equipment that comprises a propulsion unit 700 worn by the user on each hand and/or forearm. Such propulsion units 700 may be heavy. Accordingly, in some embodiments, an attachment device 500 is mounted on the chair 1 and a complementary attachment device may be provided on the flight propulsion units 700.

In some embodiments, an attachment device 500 is mounted on the torso support 20 at either end, as shown in the figures. In some embodiments, the attachment devices 500 might be provided elsewhere on the chair 1, but preferably in a location that can be reached by a user seated on the seat 10. For example, the attachment devices 500 may be located 10 cm to 40 cm (preferably 15 cm to 25 cm, most preferably 20 cm) forwardly of the ends of the torso support 20. In this way, a user may comfortably attach the propulsion units 700 to the chair 1 via the attachment devices 500 while seated on the seat 10.

Preferably, the attachment device 500 enables the propulsion units to be attached to the end of the torso support 20 in a manner that prevents their rotation.

Further embodiments of the invention may therefore include a mounted propulsion unit and chair assembly comprising a pair of propulsion units detachably attached to the attachment devices.

Any complementary attachment devices may be used. However, in some embodiments, the attachment device 500 of the chair 1 may be a channel, arranged to receive an elongate member forming part of the propulsion unit.

Figure 5:
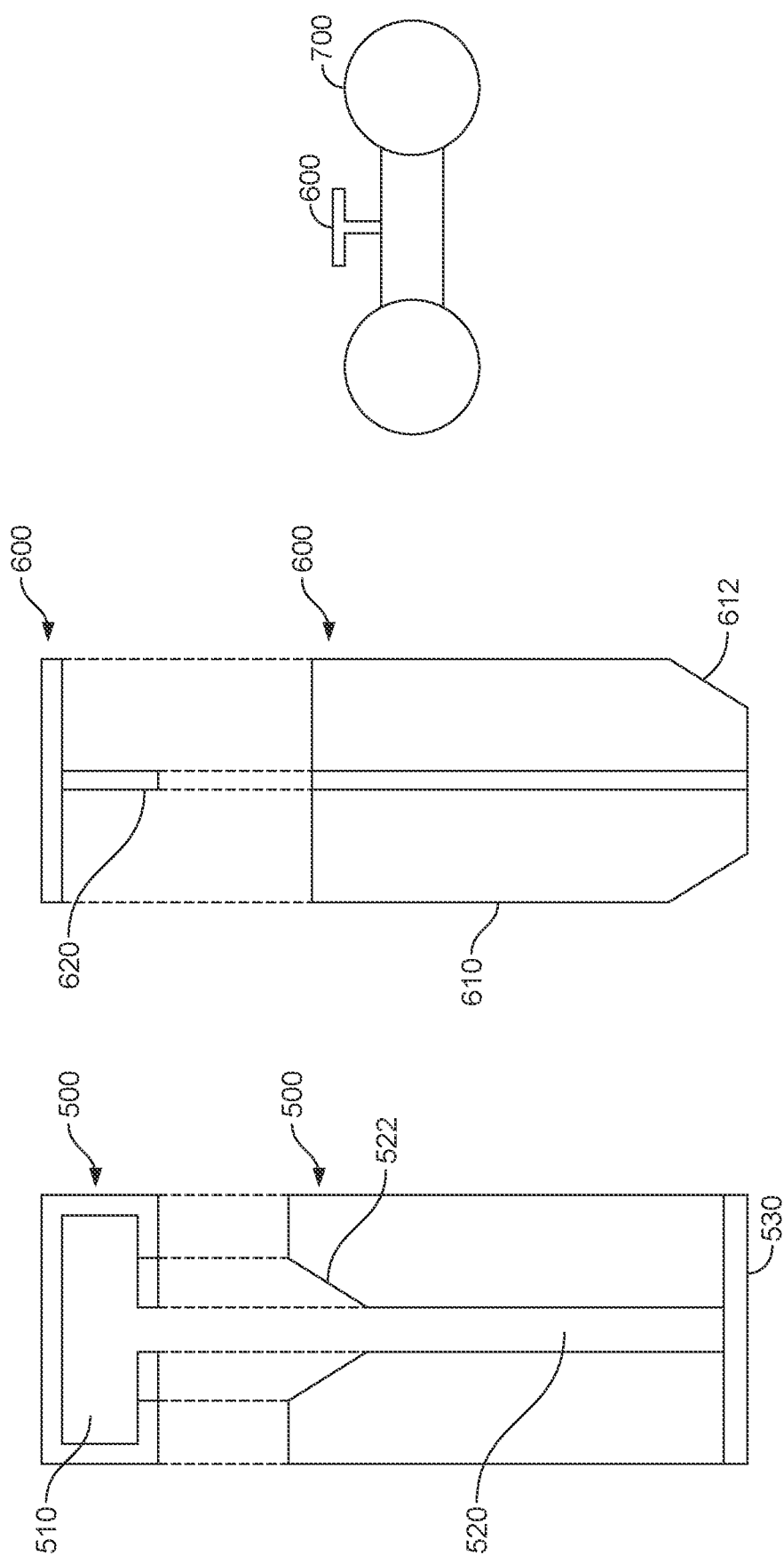
FIG. 5 shows an attachment device.

A preferred set of complementary attachment devices 500, 600 is shown in FIG. 5. The first attachment device 500 may be in the form of a slotted channel. That is, the first attachment device 500 may comprise a channel 510 having a slot 520. The end of the channel 510 or slot 520 may be blocked by a stop 530. The attachment device 500 may be mounted to the ends of the torso support 20 such that the slot is accessible by the user, for example, facing laterally outwardly with respect to the chair 1.

The second attachment device 600 may be an elongate member with a T-shaped cross-section. That is, the second attachment device 600 may comprise a blade 610 extending from a distal side of a rib 620, where the proximal side of the rib 620 may be mounted to a propulsion unit 700 as shown.

In use, the propulsion unit may be attached to the torso support 20 by inserting the blade 610 into the channel 510, with the rib 620 extending through the slot 520.

Preferably, the blade 610 may have a tapered end 612 for assisting the insertion of the blade 610 into the channel 510.

Preferably, the slot 520 may have an angled opening 522 for assisting the insertion of the rib 620 into the slot 520.

While, the attachment devices 500, 600 have been depicted such that the second attachment device 600 is mounted to a propulsion unit 700 and the first attachment device is mounted to the chair 1, embodiments are envisaged in which the first attachment device 500 is mounted to a propulsion unit 700 and the second attachment device is mounted to the chair 1.

The chair 1 may comprise a fuel storage vessel, such as a tank or bladder, which may be used for refuelling the personal flying equipment while the user is seated on the seat 10.

The chair 1 described herein may be secured to the ground or a vehicle or may form part of a vehicle, and by used for the take-off or landing of a user of personal flying equipment.

Taking as an example a user flying with propulsion units on each hand and on the rear of their torso, the user may approach the chair 1 from the rearmost end, facing the contact surface 22. As the user approaches the chair 1, the user may extend their legs on either side of the seat 10 and seat portion 100. Depending on the height and angle of the user's approach, their legs may straddle the arm and/or torso portion 200 to which the torso support 20 is mounted. The user will then reduce height until seated on the seat 10. If the user is further forward than desired, contact can be made with the contact surface 22, preventing the user from overshooting the seat 10 any further. If the user is not adequately centered, contact with the contact surface 22 can provide a reaction force preventing the user from unintentionally moving away from seat 10 in the lateral direction. The reaction force can further act to center the user.

The chair 1 may be advantageously employed on a vehicle. The chair 1 may be mounted on a surface of the vehicle that is accessible by the user in-flight. That is, the chair 1 may be mounted on an external surface of the vehicle. Alternatively, the surface may be an internal surface that is accessible by the user in-flight.

The chair 1 can be used for landing on a vehicle that is moving. For example, the vehicle may be a surface of an automobile, or a trailer of an automobile. The chair 1 is of particular utility when used on a boat (for example a "rib"—rigid-hulled inflatable boat). The user may have difficulty in landing on a boat that is under the influence of waves, causing the desired landing surface to pitch and roll and vary in height. The use of the chair 1 can enable the user to more safely land on such a vehicle.

Further embodiments of the invention may therefore include a vehicle assembly comprising a vehicle and the chair 1, wherein the base 40 is a surface of the vehicle or the base 40 is attached to a surface of the vehicle. Preferably, the base 40 is an external surface of the vehicle. The vehicle may be: a boat; a raft; an automobile; a trailer; a submarine; or an aircraft.

The invention claimed is:

1. A vehicle assembly comprising:
    a vehicle; and
    a chair for use in take-off or landing of a user wearing personal flying equipment, comprising:
        a seat for the user to straddle such that the user faces in a forward direction;
        a torso support for supporting a torso of the user sitting on the seat, the torso support being concave and thereby defining an opening facing the seat;
        a structure to which the seat and torso support are mounted; and
        a base member rigidly connected to the structure and extending outwardly therefrom,
    wherein the torso support extends outwardly to either side of the structure leaving a space below for receiving a leg of the user sat on the seat, and wherein the chair is mounted on a surface of the vehicle such that it is accessible by the user in-flight.

2. The vehicle assembly of claim 1, wherein the vehicle is: a boat; a raft; an automobile; a trailer; a submarine; or an aircraft.

* * * * *